(12) United States Patent
Prud'Homme-Lacroix et al.

(10) Patent No.: US 8,714,480 B2
(45) Date of Patent: May 6, 2014

(54) ROTARY WING AIRCRAFT PROVIDED WITH AN EMERGENCY UNDERCARRIAGE

(75) Inventors: Pierre Prud'Homme-Lacroix, Vitrolles (FR); Robert Dubois, Aix en Provence (FR)

(73) Assignee: Airbus Helicopters, Marignane Cedex (FR)

( * ) Notice: Subject to any disclaimer, the term of this patent is extended or adjusted under 35 U.S.C. 154(b) by 390 days.

(21) Appl. No.: 13/033,037

(22) Filed: Feb. 23, 2011

(65) Prior Publication Data
US 2011/0204182 A1    Aug. 25, 2011

(30) Foreign Application Priority Data

Feb. 24, 2010   (FR) .................................. 10 00752

(51) Int. Cl.
*B64C 25/10*   (2006.01)
(52) U.S. Cl.
USPC ........................................................ 244/102 R
(58) Field of Classification Search
USPC ............ 244/102 R, 102 SL, 108, 109, 110 E, 244/110 R, 100 R, 101, 102 A, 102 SS, 104 R
See application file for complete search history.

(56) References Cited

U.S. PATENT DOCUMENTS

| 227,747 | A |   | 5/1880  | Fenley |
| 2,454,611 | A |   | 11/1948 | Paraskevas |
| 2,776,148 | A |   | 10/1954 | Geerds |
| 2,927,747 | A |   | 3/1960  | Bennie |
| 3,122,345 | A | * | 2/1964  | Thule ......................... 244/102 R |
| 3,335,981 | A | * | 8/1967  | Pauli et al. ................. 244/102 R |
| 4,378,098 | A | * | 3/1983  | Evans ........................ 244/137.1 |
| 5,209,431 | A | * | 5/1993  | Bernard et al. ............ 244/17.17 |
| 7,198,226 | B2 | * | 4/2007 | Muylaert et al. ............... 244/116 |

FOREIGN PATENT DOCUMENTS

| EP | 0049964 A2 | 4/1982 |
| EP | 0324683 A1 | 7/1989 |
| GB | 1351739    | 5/1974 |

OTHER PUBLICATIONS

Search Report and Written Opinion; Application No. FR 1000752; dated Oct. 18, 2010.

* cited by examiner

*Primary Examiner* — Timothy D Collins
*Assistant Examiner* — Brian M O'Hara
(74) *Attorney, Agent, or Firm* — Brooks Kushman P.C.

(57) ABSTRACT

A rotary wing aircraft (1) provided with an emergency undercarriage (10) for mitigating a failure of a basic undercarriage (2) of the rotary wing aircraft (1). Said emergency undercarriage comprises a main member (20) that extends from a first end (21) to a second end (22), said emergency undercarriage (10) having deployment means (30) for deploying the main member (20) out from a housing (3) in order to take over from a basic undercarriage (2) of a rotary wing aircraft (1) in the event of a failure, said emergency undercarriage (10) being provided with holder means (40) for holding it in position to block said main member (20) when said main member (20) is deployed out from said housing (3).

19 Claims, 3 Drawing Sheets

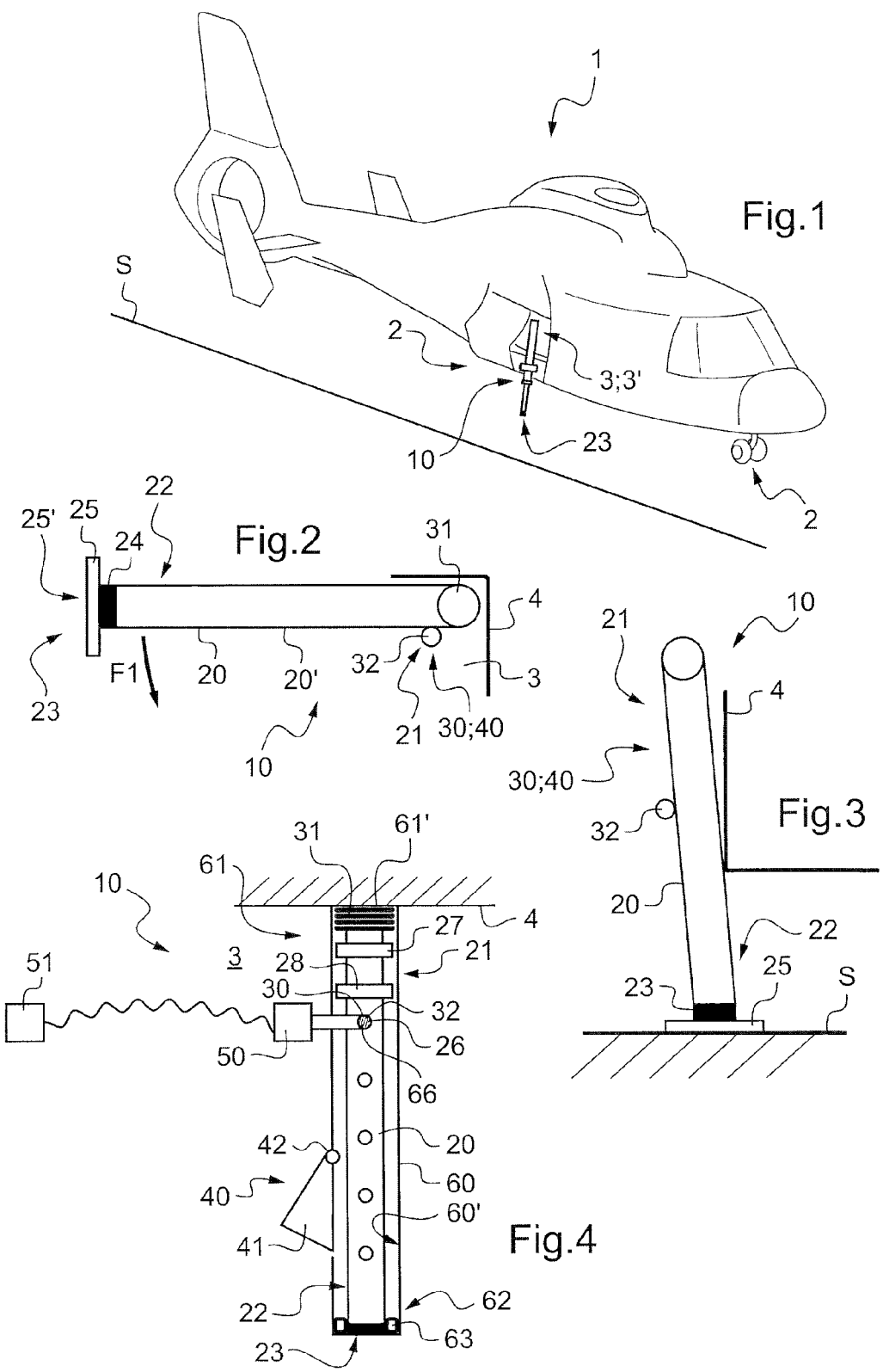

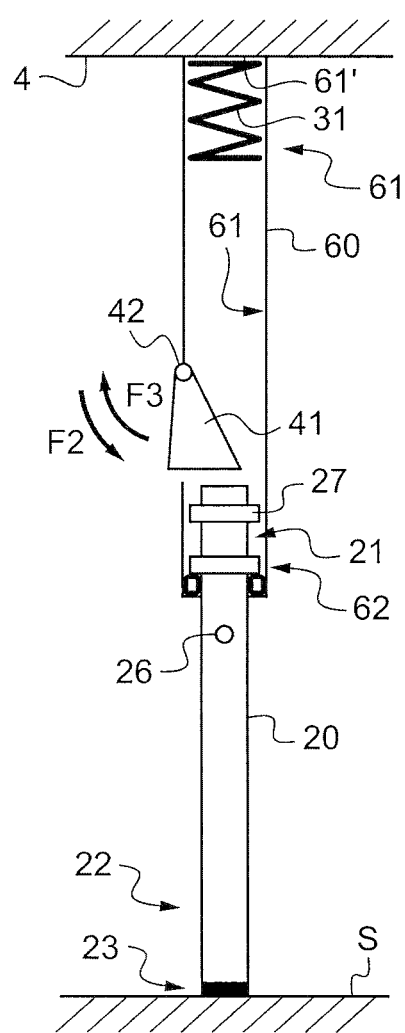

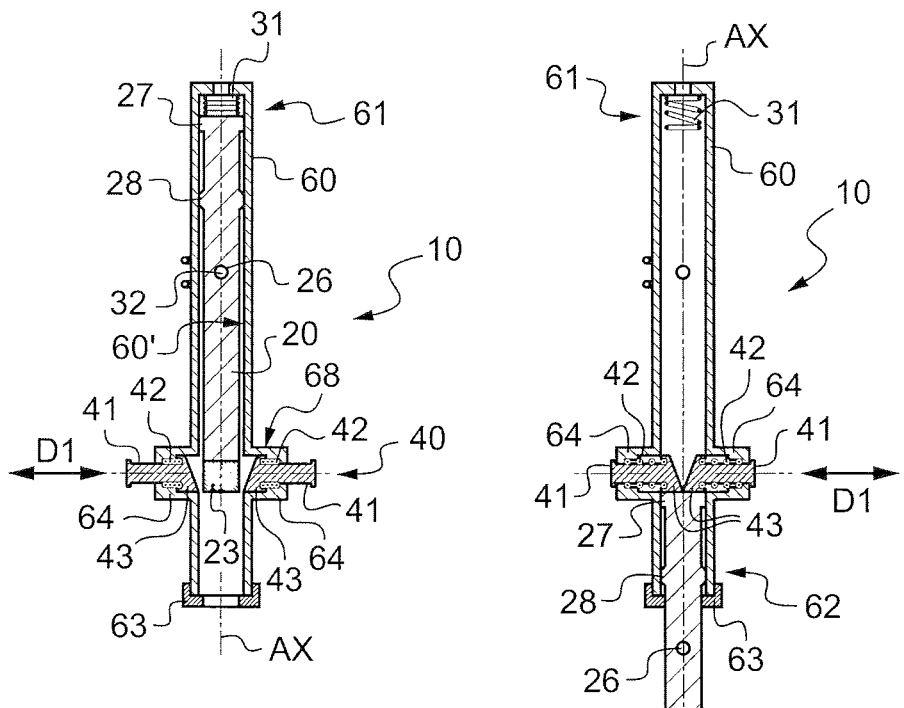
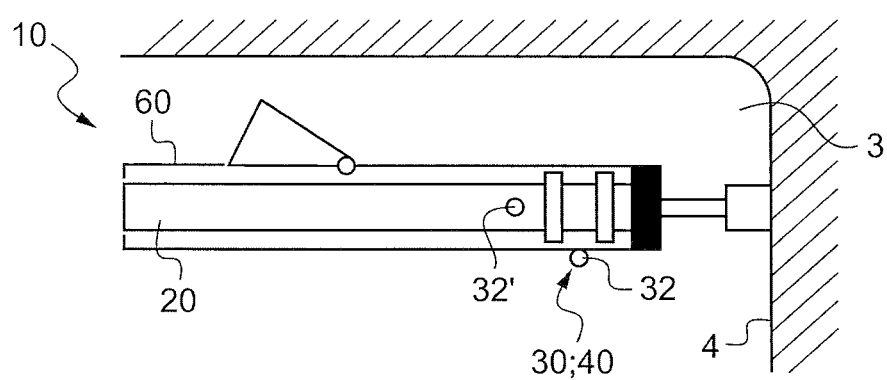

ROTARY WING AIRCRAFT PROVIDED WITH AN EMERGENCY UNDERCARRIAGE

CROSS REFERENCE TO RELATED APPLICATIONS

This application claims the benefit of FR 10 00752 filed on Feb. 24, 2010, the disclosure of which is incorporated in its entirety by reference herein.

BACKGROUND OF THE INVENTION (1) Field of the Invention

The present invention relates to a rotary wing aircraft provided with an emergency undercarriage. The invention lies in particular in the field of landing gear for rotary wing aircraft, and more particularly rotorcrafts.

(2) Description of Related Art

Conventionally, an aircraft includes landing gear via which it stands on the ground. For example, the landing gear may be provided with three or four wheeled undercarriages constituting a support polygon for the aircraft on the ground. Undercarriages are also known that have skids.

Such undercarriages may be retractable in order to optimize the aerodynamic drag of the aircraft. The most prominent elements of the aircraft are folded into the inside of the fuselage, in particular retractable landing gear. More precisely, each undercarriage is retracted in flight into a compartment conventionally referred to as a landing-gear bay, so as to be ready for deploying when required for landing.

It should be recalled that landing gear may comprise not only main undercarriages close to the center of gravity in order to support a major fraction of the weight of the aircraft, but also auxiliary undercarriages located towards the nose or the tail of the aircraft in order to provide stability and contribute to steering the aircraft on the ground. In this context, an undercarriage arranged near the nose of the aircraft is sometimes referred to as the "nose" undercarriage, whereas an undercarriage arranged near the tail of the aircraft is sometimes referred to as the "tail" undercarriage.

An auxiliary undercarriage is advantageously steerable, unlike a main undercarriage.

Retractable main or auxiliary undercarriages thus present an advantage from an aerodynamic point of view. Nevertheless, like any other system, such undercarriages might be subject to failure, and for example they might remain blocked in their landing-gear bays in flight inside the fuselage in the event of a failure of their deployment system, which failure may be of mechanical, electrical, or indeed hydraulic order.

Under such circumstances, at least one undercarriage of an aircraft may remain blocked in its bay, even though the probability of having several undercarriages blocked simultaneously is low. In the event of failure, recourse is made to palliative means that are effective to a greater or lesser extent.

In a first method that is applicable to an undercarriage having a hydraulic actuator for extending it, the undercarriage can be extended manually in the event of a failure, e.g. by using a manual pump or an electric pump if there is a failure of hydraulic pressure generation.

In a second method, that is applicable to a rotary wing aircraft of the rotorcraft type that can hover close to the ground, an operator may be tempted to extend the undercarriage from the outside. It will be understood that such an operation is risky or even dangerous. This operation is not recommended by rotorcraft manufacturers.

In a third method applicable to a rotary wing aircraft of the rotorcraft type capable of hovering close to the ground, an operator installs tooling on the landing area and the pilot puts the rotary wing aircraft down on the tooling at the time of landing. It is then necessary to have suitable tooling available. Nevertheless, it can be understood that landing is then complicated since the pilot needs to put the aircraft down accurately on the tooling.

In a fourth method, the pilot lands with at least one undercarriage retracted inside the fuselage. This method inevitably leads to damage to the fuselage and thus gives rise to repair costs that are likely to be expensive, even for a helicopter type rotorcraft that is capable of landing very slowly.

In a fifth method applicable with a rotary wing aircraft of the rotorcraft type, such as a helicopter in particular, the pilot lands in a gravel pit provided for this purpose, said pit allowing the aircraft to be put down on a surface that is soft and that matches itself as closely as possible to the shape of the fuselage so as to limit the damage caused by landing.

It can be understood that in the event of an undercarriage failing, it is difficult to land without damaging the aircraft and/or without endangering a person taking action on the outside.

An object of the present invention is thus to propose a rotary wing aircraft provided with a device for facilitating landing of the rotary wing aircraft in the event of at least one undercarriage failing.

It should be observed that it is common practice to use a retractable stand on a motorcycle in order to park the motorcycle. That teaching is remote from the technical field of the invention insofar as the stand of a motorcycle is not required to compensate for a failure to deploy an undercarriage wheel. The stand is essential for parking the motorcycle in normal operation, and as a result it is not used in the event of an undercarriage failing.

Similarly, document GB 1 351 739 discloses a device for stabilizing a trailer while performing loading or unloading operations, and a tractor while performing predetermined work. The teaching of that document GB 1 351 739 is thus remote from the technical field of the invention, since the means described do not have the function of replacing an undercarriage blocked in a bay.

Similarly, the state of the art also includes document U.S. Pat. No. 2,776,148 A, document EP 0 324 683 A1, document U.S. Pat. No. 2,454,611 A, document U.S. Pat. No. 227,747 A, and document EP 0 049 964 A2.

Document U.S. Pat. No. 2,776,148 A relates to a docking station for a trailer, and more precisely a station that supports a front portion of the trailer.

Document EP 0 324 683 A1 relates to means for stabilizing a helicopter having tricycle landing gear used in addition to undercarriages for stabilizing said helicopter on a moving platform.

Document U.S. Pat. No. 2,454,611 A relates to retractable landing gear.

Document U.S. Pat. No. 2,927,747 A describes to landing gear for landing on sloping ground.

Document EP 0 049 964 A2 describes means for supporting a helicopter on a platform.

SUMMARY OF THE INVENTION

According to the invention, there is provided a rotary wing aircraft with at least one basic undercarriage retractable into a landing-gear bay, and more particularly an aircraft capable of landing vertically or substantially vertically and suitable for landing with a forward speed that is extremely low or zero, such as a rotorcraft of the helicopter type.

The aircraft further includes an on-board emergency undercarriage for mitigating a failure of a basic undercarriage of a rotary wing aircraft, for taking the place of said basic undercarriage. The emergency undercarriage comprises a main member extending from a first end to a second end, the emergency undercarriage having deployment means for deploying the main member out from a housing in order to take the place of a basic undercarriage of the rotary wing aircraft in the event of a failure, the emergency undercarriage being provided with holder means for holding it in position so as to block the main member when said main member is deployed out from the housing.

It should be observed that in order to limit any risk of damaging each emergency undercarriage, the pilot of the rotary wing aircraft ensures that the forward speed is as slow as possible or zero and ensures that vertical speed is under control, these forward and vertical speeds being specified in the flight manual, for example.

It should be understood that the term "basic" undercarriage is used for convenience to designate an undercarriage of the landing gear of a rotary wing aircraft. An undercarriage that is said to be "basic" may equally well be a main undercarriage or an auxiliary undercarriage of landing gear, or it may be a retractable skid undercarriage.

The term "basic" is used in contrast to the term "emergency" which is used for designating the retractable undercarriage of the invention, which emergency undercarriage is deployed instead of the basic undercarriage in the event of a failure of the basic undercarriage.

Furthermore, the term "deploy the main member out from a housing" means in particular that the second end of the main member is caused to extend from the housing so as to project outside the fuselage of the rotary wing aircraft.

Thus, in a normal mode of operation, i.e. when the basic undercarriage has not failed, a pilot deploys the basic undercarriage in order to land on the ground.

In contrast, in an emergency mode of operation, i.e. when a basic undercarriage has failed and cannot be fully deployed, the deployment means of the emergency undercarriage are deployed so as to deploy the emergency undercarriage, in particular by causing the main member to extend at least in part from the housing in which said main member was previously retracted. Consequently, the holder means are actuated so that the main member is held in position and not retracted under the effect of the forces exerted on said member while landing.

Deployment may be performed electrically or by an operator intervening, which operator may be an occupant of the rotary wing aircraft.

The invention thus provides an aircraft provided with an emergency undercarriage capable of taking over from a usual basic undercarriage in order to mitigate a deficiency of a failed corresponding basic undercarriage. The emergency undercarriage provides emergency support that replaces the support that would normally be provided by the faulty basic undercarriage.

Furthermore, it should be observed that the dimensioning of the emergency undercarriage and in particular of its main member takes account of the extreme points of the weight/centering diagram of the rotary wing aircraft, i.e. the points that correspond to the greatest weight and to the lowest weight together with the possible longitudinal and latitude excursions of the center of gravity, in order to guarantee that the horizontal plane of the aircraft as formed by the support polygon including the emergency support supplied by the emergency undercarriage always complies with the guidelines of the flight manual in terms of permission to land on sloping ground so as to ensure that the rotary wing aircraft is stable when standing on the ground.

The emergency undercarriage of the aircraft may also include one or more of the following additional characteristics.

For example, the main member is a main tube.

In addition, the main member may include a ground contact member, extending the second end of said main member.

The ground contact member may be made of elastomer so as to present stiffness having the same order of magnitude as the stiffness of a conventional basic undercarriage, i.e. lying in the range 5 decanewtons per millimeter (daN/mm) to 500 daN/mm for a helicopter, depending on the class of the aircraft.

In an aspect of the invention, the main member is provided with damper means, e.g. connecting the second end to the contact member.

By way of example, the contact member may be a rigid member extending the second end via damper means of the spring type, or of the type comprising a layer of elastomer, so as to impart stiffness to the assembly comprising the damper means and the contact means that is of the same order of magnitude as the stiffness of a conventional basic undercarriage.

Furthermore, the contact member may be provided with a foot for maximizing the contact area between the emergency undercarriage and the ground.

Such a foot then optionally makes it possible to allow the rotary wing aircraft to have a slow forward speed by allowing the aircraft to slide over a very short distance without the emergency undercarriage penetrating into the ground and blocking the aircraft. The foot could also be a ski suitable for sliding on a snow-covered surface, where necessary.

The foot may also serve as an aerodynamic cover that extends the continuity of the fuselage of the rotary wing aircraft when the emergency undercarriage is retracted in a housing inside the rotary wing aircraft.

In another variant, the contact member may be provided with a wheel.

Furthermore, the deployment means optionally comprise a resilient deployment member such as a spring that acts on the main member in order to deploy said main member out from a housing in order to take over from a basic undercarriage of a rotary wing aircraft in the event of a failure.

Furthermore, the deployment means optionally comprises a pin, i.e. a movable pin, for example. The pin co-operates with the main member to hold said main member in a housing during a normal mode of operation, and to allow said main member to be deployed out from the housing during an emergency mode in order to take over from a basic undercarriage of a rotary wing aircraft in the event of a failure.

In an aspect, the pin is removed, thereby enabling the resilient deployment member to exert a force on the main member so that said main member, and in particular the contact member of said main member, is extended out from the housing containing the emergency undercarriage.

In a variant, the holder means comprise the pin of the deployment means, the pin also co-operating with the main member so as to hold said main member outside a housing after it has been deployed.

After deployment, the operator places the pin in a receiver provided for this purpose so as to block the main member in a predetermined position.

In an automatic variant, the emergency undercarriage includes mover means for moving the deployment means and a control member for controlling the mover means, the control member causing the mover means to move the deployment means so as to deploy the main member out from a housing.

For example, the mover means may be electromagnetic means suitable for causing a pin of the deployment means to move in translation. In another example, the pin has a threaded portion and the mover means comprise a motor meshing with the threaded portion.

The device for operating the emergency undercarriage may be passive. Thus, the control member may be a control for moving by a pilot.

Nevertheless, the device may also be active. The control member may then be a processor connected to sensors that indicate when a basic undercarriage has become blocked, e.g. a position sensor indicating that the basic undercarriage is not deployed. Depending on the information it receives, the control member may then cause the emergency undercarriage to be deployed.

It should be observed that the control member may also be connected to the avionics system of the rotary wing aircraft in order to cause the main member to be deployed to a greater or lesser extent, as a function of avionics information, e.g. relating to the weight of the rotary wing aircraft or indeed to the weight of fuel present in its tanks. The portion of the main member projecting from the housing for the emergency undercarriage when said main member is deployed then extends outside the housing over a length that is variable as a function of said avionics information. This device seeks mainly to adapt the length that is deployed so that it matches the lengths provided on basic undercarriages under current loading conditions.

In a first embodiment, the emergency undercarriage is of the pivotable emergency undercarriage type. The main member is then fastened to the rotary wing aircraft via a hinge, the hinge enabling the main member to pivot.

In a normal mode of operation, the main member is held in a housing in a direction that is said to be "horizontal". During an emergency mode of operation, the deployment means release the main member which then pivots so as to reach a position that is substantially vertical.

In a second embodiment, the emergency undercarriage includes a secondary member in which the first end of the main member slides. The emergency undercarriage is then a telescopic emergency undercarriage.

In the normal mode of operation, the main member is retracted inside the secondary member. However, during the emergency mode of operation, the main member moves in translation relative to the secondary member in order to project outside the secondary member and the housing that receives the emergency undercarriage.

Optionally, the first end is provided with a first shoulder and with a second shoulder that co-operate with the inside periphery of the secondary member. The purpose of these shoulders is more particularly to provide good stability to the main member inside the secondary member and to impart sufficient bending strength to the emergency undercarriage to enable it to support the rotary wing aircraft.

It should be observed that the first shoulder and the second shoulder are machined so as to provide manufacturing tolerances that guarantee that the main member slides in the secondary member and takes up the resulting stresses and bending moments.

Furthermore, the secondary member extends from a first end zone to a second end zone, and the second end zone may be provided with an abutment through which the main member passes when the main member is deployed out from a housing in an emergency mode of operation, the abutment then co-operating with the second shoulder in order to limit the movement in translation of the main member relative to the secondary member. Extension of the main member relative to the secondary member is then limited by co-operation between the abutment and the second shoulder, i.e. the shoulder of the main member that is closest to said abutment. By way of example, the abutment may be a plug screwed onto the second end zone.

A third embodiment is the result of combining the first and second embodiments. Under such circumstances, the secondary member provided by the second embodiment is fastened to the rotary wing aircraft via a hinge of the kind provided in the first embodiment, the hinge enabling the secondary member to pivot. The emergency undercarriage is then an emergency undercarriage that is both telescopic and pivotal.

Furthermore, the holder means optionally include at least one latch co-operating with the first end in order to block the main member when said main member is deployed out from the housing in which the undercarriage is arranged.

Additionally, the holder means may include resilient mover means urging each latch to penetrate into the inside of the secondary member so as to block the main member in a position.

For this purpose, the latch may move in pivoting or in translation, for example.

Optionally, the retractable emergency undercarriage is arranged in the landing-gear bay of the corresponding basic undercarriage.

BRIEF DESCRIPTION OF THE DRAWINGS

The invention and its advantages appear in greater detail from the following description of embodiments given by way of illustration with reference to the accompanying figures, in which:

DETAILED DESCRIPTION OF THE PREFERRED EMBODIMENT

FIG. 1 is a diagram showing a rotary wing aircraft provided with an emergency undercarriage that is deployed;

FIGS. 2 and 3 are diagrams explaining a first embodiment;

FIGS. 4 and 5 are diagrams explaining a first preferred variant of a second embodiment;

FIGS. 6 to 9 are diagrams explaining a second preferred variant of a second embodiment; and FIG. 10 is a diagram showing a third embodiment.

Elements present in more than one of the figures are given the same references in each of them.

FIG. 1 shows a rotary wing aircraft 1, specially a rotorcraft of the helicopter type.

In order to stand on ground S, the rotary wing aircraft is provided with landing gear provided with three basic undercarriages 2 having retractable wheels, two main basic undercarriages (not shown in FIG. 1 to avoid overloading the figure), and a secondary basic undercarriage disposed at the nose of the rotary wing aircraft 1. Each basic undercarriage 2 is arranged in a landing-gear bay 3.

In a normal operation mode, a pilot deploys each basic undercarriage 2 from its landing-gear bay 3' prior to landing, and in flight retracts each basic undercarriage 2 into its landing-gear bay 3' in order to limit the aerodynamic drag of the rotary wing aircraft 1. Furthermore, the rotary wing aircraft includes at least one retractable emergency undercarriage 10 located in a housing 3 of the rotary wing aircraft, and advantageously one emergency undercarriage 10 per basic undercarriage 2 disposed in the landing-gear bay 3' of the basic undercarriage 2 so as to enable the emergency undercarriage to take over therefrom in an emergency mode of operation.

Thus, if the main deployment of a basic undercarriage does not operate, secondary deployment means may optionally be used to extend the basic undercarriage from the landing-gear bay. For example, the secondary deployment means may be a manual pump powering a hydraulic actuator.

If it is found to be impossible to deploy a basic undercarriage, then an emergency mode of operation is put into effect. During this emergency mode of operation, the emergency undercarriage 10 corresponding to the blocked basic undercarriage is extended from its housing in order to mitigate the observed failure.

Depending on its version, the emergency undercarriage 10 may be deployed manually by an operator present in the rotary wing aircraft, or it may be deployed by a device suitable for being activated by an active system or a remote system, e.g. by the pilot.

It should be understood that the term "deployment" is used of a basic or an emergency undercarriage to mean that the undercarriage is deployed at least in part out from its housing. A portion of the undercarriage may remain in its housing while another portion for coming into contact with the ground projects from the housing outside the rotary wing aircraft.

FIGS. 2 and 3 show an emergency undercarriage in a first embodiment, this embodiment undercarriage being retracted into a housing 3 in a rotary wing aircraft 1 in FIG. 2, and being deployed so as to project in part from said housing 3 in FIG. 3.

Independently of the embodiment, the emergency undercarriage 10 comprises a main member 20 for coming into contact with the ground S during an emergency mode of operation, the main member 20 extending from a first end 21 to a second end 22. This main member 20 is an elongate main member such as a tube, referred to for convenience as the "main" tube, however it could be of any other form.

Furthermore, the emergency undercarriage 10 is fitted with deployment means 30 so as to enable the main member 20 to be held in the housing 3 during a normal mode of operation, and to allow the main member 20 to be deployed out from the housing 3 during the emergency mode of operation so that the main member 20 can mitigate the failure of the associated basic undercarriage.

In addition, the emergency undercarriage 10 includes holder means 40 for blocking the main member 20 in a position as pre-established by the manufacturer when the main member 20 is deployed.

Furthermore, when the emergency undercarriage 10 is deployed, the portion for coming into contact with the ground and projecting from the housing 3 outside the rotary wing aircraft is optionally provided with a contact member 23 for contacting the ground S. More precisely, the contact member 23 is fastened to the second end 22 of the main member 20. It should be observed that the contact member may be incorporated in the second end 22, then constituting the end portion of said second end 22.

The contact member may be made of a material that forms part of the elastomer class, for example.

In a variant, the main member 20 may possess damper means 24 having stiffness of the same order of magnitude as the stiffness of a conventional basic undercarriage, i.e. lying in the range 5 daN/mm to 500 daN/mm for a helicopter, depending on the type of aircraft.

The damper means may also connect the contact member 23 to the end portion of the second end 22, e.g. comprising a spring connected firstly to said end portion and secondly to the contact member 23.

Furthermore, it should be observed that the contact member 23 may possess a foot 25 in order to maximize the contact area 25' of the contact member 23 with the ground S. In addition, the foot enables the emergency undercarriage to be used equally well on surfaces that are hard and non-deformable and on surfaces that are soft and deformable. As a variant that is not shown in a figure, the contact member may be a wheel.

Furthermore, the deployment means 30 comprise at least one pin 32 co-operating with the main member 20 to block it in the housing 3 of the emergency undercarriage 10 during the normal mode of operation and to allow the main member 20 to be deployed during an emergency mode of operation.

In order to facilitate deployment, the deployment means 30 include a resilient deployment member exerting a force on the main member 20 in order to facilitate moving it out from the housing 3.

Finally, the holder means 40 may comprise the pin 32 of the deployment means.

With reference to FIG. 2, in the first embodiment, the main member 20 is hinged to a strong frame 4 of the rotary wing aircraft via a hinge that allows said main member 20 to move in pivoting. The deployment means 31 are then optionally provided with a spring arranged around said hinge in order to encourage the main member 20 to pivot.

The pin 32 of the deployment means 30 then co-operates with an outside periphery 20' of the main member 20 so as to hold it inside the housing 3. This pin 32 may be engaged in an orifice in the rotary wing aircraft 1. It should be observed that this pin 32 may pass through the main member 20 for this purpose.

During the emergency mode of operation, the pin is removed. This results in the main member 20 performing a pivoting movement along arrow F1.

With reference to FIG. 3, the pin 32 is returned to its original location. The main member 20 is then wedged between the pin 32 and the strong frame 4. Consequently, the pin 32 does indeed constitute holder means for holding the main member 20 in the "undercarriage deployed" position.

With reference to FIG. 4, in a second embodiment, the main member is deployed by a movement that is not in pivoting, but rather in translation.

The main member 20 is arranged in an elongate secondary member 60, the first end 21 of the main member 20 being capable of sliding inside the secondary member 60. This secondary member 60 extends from a first end zone 61 fastened to a strong frame 4 of the rotary wing aircraft to a second end zone 62. The secondary member is optionally a hollow secondary tube.

The first end of the main member 20 may include a first shoulder 27 and a second shoulder 28 that co-operates with the inside periphery 60' of the hollow secondary member 60.

Consequently, the second end zone 62 has an abutment 63 limiting extension of the main member 20 out from the secondary member 60 by blocking the second shoulder 28. This abutment 63 may be made using a plug having a central orifice suitable for having the main member 20 pass therethrough, the plug being screwed to the second end zone 62.

The means for deploying the emergency undercarriage 10 comprise a pin 32 that passes through at least one secondary orifice 66 in the secondary member and then one main orifice 26 in the main member 20.

It should be observed that the secondary member may have a plurality of secondary orifices 66 distributed in an axial direction of said secondary member 60.

As a function of which particular secondary orifice 66 has the pin 32 passing therethrough, the main member 20 projects from the secondary member 60 to a greater or lesser extent. Conversely, a secondary orifice 66 may be provided that is located in the second end zone 62, and a plurality of primary orifices may be formed axially in the main member 20.

Furthermore, the pin 32 may be moved by an operator.

Nevertheless, in the version shown in FIG. 4, the emergency undercarriage 10 may possess mover means 50 for moving the deployment means 30, and a control member 51 for controlling said mover means 50.

The mover means may be electromagnetic means or indeed a motor co-operating with a threaded pin 32, for example. The control member 51 is either a control operable by an operator or a processor that requests deployment of the main member 20 from the secondary member 60 and from the housing 3 as a function of information coming from dedicated sensors.

A plurality of pins may be provided, each co-operating with a respective secondary orifice, each pin being associated with mover means.

Furthermore, the mover means shown diagrammatically possess a resilient mover member 31 such as a spring arranged between the first end 21 of the main member 20 and a base 61' of the first end zone 61. The spring is then compressed during the normal mode of operation.

In addition, the holder means include at least one latch 41 co-operating with the first end 21 to block the main member 20 when said main member 20 is deployed out from the housing 3. Resilient mover means 42 tend to cause each latch 41 to penetrate into the inside of the secondary member via a slot formed in the secondary member 60.

In a first variant of the second embodiment, the latch 41 is a triangular plate hinged via a resilient hinge 42 to the secondary member 60.

During an emergency mode of operation, the pin 32 is removed so as to release the main member 20.

With reference to FIG. 5, the deployment member 31 relaxes, thereby exerting a force on the main member 20 that slides in the secondary member 60. It should be observed that an operator may also cause the secondary member to slide manually.

The movement in translation of the main member 20 in the secondary member 60 is stopped by the abutment 63 when the second shoulder 28 comes into contact with said abutment 63.

Furthermore, the latch 41 performs a pivoting movement along arrow F2 and penetrates in part into the secondary member 60. The main member 20 can then no longer move back up to its initial position, at least not unless action is taken to move the latch 41 along arrow F3.

FIGS. 6 to 9 show a second variant of the second embodiment in which each latch 41 performs not only a movement in pivoting, but also a movement in translation.

In this second variant, each latch 41 is disposed in a radial projection 68 of the secondary member 60. With the secondary member 60 extending along a middle axis AX, each latch is capable of performing a movement in translation along a direction D1 that is substantially perpendicular to the middle axis AX.

More particularly, the emergency undercarriage 10 shown diagrammatically has two latches 41, disposed symmetrically about the middle axis AX.

As shown in FIG. 8, during the normal mode of operation, a resilient deployment member 42 urges each latch 41 against the main member 20, and in particular against its contact member 23. A pin 32 holds the main member 20 in the secondary member 60.

With reference to FIG. 9, during an emergency mode of operation, the pin 32 is removed so as to release the main member 20. The deployment member 31 then relaxes and exerts a force on the main member 20 that slides in the secondary member 60. The movement in translation of the main member 20 in the secondary member is then stopped by the abutment 63 when the second shoulder 28 comes into contact with said abutment 63.

Furthermore, each latch 41 performs a movement in translation along the direction D1 and penetrates into the inside of the secondary member 60. A bottom surface 43 of each latch 31 then blocks the first end 21. Thus, the main member 20 can no longer move back up to its initial position, unless external action is taken.

Finally, FIG. 10 shows a third embodiment resulting from a combination of the above-described first and second embodiments.

The emergency undercarriage then comprises a main member 20 that is slidable in a secondary member 60, a first pin 32' of deployment means holding the main member 20 in the secondary member 60.

In addition, the secondary member 60 is hinged to a strong frame 4 so as to be capable of performing a movement in pivoting. Under such circumstances, the deployment means comprise a second pin 32 that co-operates with the outer periphery of the secondary member 60.

In order to deploy the main member, the first pin and then the second pin are removed in succession, or vice versa.

It should be observed that it is possible to use a single pin that passes through a structural element of the rotary wing aircraft, the secondary member 60, and the main member 20.

Naturally, the present invention may be subjected to numerous variants as to its implementation. Although several embodiments are described above, it will readily be understood that is not conceivable to identify exhaustively all possible embodiments. It is naturally possible to envisage replacing any of the means described by equivalent means without going beyond the ambit of the present invention.

What is claimed is:

1. A rotary wing aircraft having at least one basic undercarriage that is retractable into a landing-gear bay, wherein the aircraft includes an emergency undercarriage for mitigating a failure of said basic undercarriage of said rotary wing aircraft, said emergency undercarriage having a main member that extends from a first end to a second end, said emergency undercarriage having deployment means for deploying the main member out from a housing and configured to take over from said basic undercarriage of said rotary wing aircraft in the event of a failure, said emergency undercarriage being provided with holder means for holding the main member in position to block said main member when said main member is deployed out from said housing, wherein said retractable emergency undercarriage is arranged in said landing-gear bay.

2. An aircraft according to claim 1, wherein said main member includes a contact member for making contact with the ground.

3. An aircraft according to claim 2, wherein said main member is provided with damper means.

4. An aircraft according to claim 2, wherein said contact member comprises a foot for maximizing a contact area of the emergency undercarriage with the ground.

5. An aircraft according to claim 1, wherein said deployment means comprise a resilient deployment member acting on said main member to deploy said main member out from a housing in order to take over from a basic undercarriage of a rotary wing aircraft in the event of a failure.

6. An aircraft according to claim 1, wherein said deployment means comprise a pin co-operating with said main member to hold said main member in a housing during a normal mode of operation, and to allow said main member to be deployed out from said housing during an emergency mode of operation in order to take over from a basic undercarriage of a rotary wing aircraft in the event of a failure.

7. An aircraft according to claim 6, wherein said holder means comprise said pin that co-operates with said main member to hold said main member outside a housing, after said deployment.

8. An aircraft according to claim 1, wherein said emergency undercarriage includes mover means for moving said deployment means and a control member for controlling said mover means, said control member causing said mover means to move said deployment means in order to deploy said main member out from a housing.

9. An aircraft according to claim 1, wherein said emergency undercarriage includes a secondary member in which said first end of said main member slides.

10. An aircraft according to claim 9, wherein said secondary member extends from a first end zone to a second end zone, said second end zone is provided with an abutment through which said main member passes when the main member is deployed out from a housing in an emergency mode of operation, and said abutment co-operates with said second shoulder to limit movement in translation of said main member relative to said secondary member.

11. An aircraft according to claim 9, wherein said holder means comprise at least one latch co-operating with said first end to block said main member when said main member is deployed out from said housing.

12. An aircraft according to claim 9, wherein said first end is provided with a first shoulder and with a second shoulder (28) that co-operate with an inside periphery of said secondary member.

13. An aircraft according to claim 12, wherein said holder means comprise resilient mover means urging said latch to penetrate into the inside of said secondary member.

14. A rotary wing aircraft having at least one basic undercarriage that is retractable into a landing-gear bay, wherein the aircraft includes an emergency undercarriage for mitigating a failure of said basic undercarriage of said rotary wing aircraft, said emergency undercarriage having a main member that extends from a first end to a second end, said emergency undercarriage having deployment means comprising a resilient deployment member acting on said main member to deploy the main member out from a housing and configured to take over from said basic undercarriage of said rotary wing aircraft in the event of a failure, said emergency undercarriage being provided with holder means for holding the main member in position to block said main member when said main member is deployed out from said housing, wherein said retractable emergency undercarriage is arranged in said landing-gear bay.

15. A rotary wing aircraft comprising:
a basic undercarriage provided with retractable landing gear supported by an aircraft frame and retractable into a landing-gear bay; and
an emergency undercarriage for mitigating a failure of the basic undercarriage, the emergency undercarriage comprising:
a main member supported by the frame for movement relative to the frame and adapted to deploy from the landing gear bay,
a pin positioned to cooperate with the main member to retain the main member in a first position within the landing gear bay, the pin adapted to translate with respect to the main member along a direction perpendicular to a longitudinal axis of the main member to release the main member from the first position,
a resilient member positioned between the frame and the main member to deploy the main member to a second position in response to the pin translating, and
a holder device adapted to cooperate with the main member to retain the main member in the second position after deployment.

16. The aircraft according to claim 15, wherein the emergency undercarriage further comprises a secondary elongate member sized to receive the main member therewithin in the first position, wherein the secondary member and main member define an aperture extending perpendicularly therethrough, the pin positioned within the aperture and through the main member to retain the main member in the first position.

17. The aircraft according to claim 16 wherein the secondary elongate member defines a first radial projection; and
wherein the holder device includes a first latch and a first latch resilient member disposed within the first radial projection, the first latch adapted to translate along a direction perpendicular to a longitudinal axis of the secondary member, wherein the first latch resilient member translates the first latch inside the secondary member when the main member reaches the second position such that a bottom surface of the first latch contacts an upper end surface of the main member to retain the main member in the second position.

18. The aircraft according to claim 15 wherein the pin is positioned between and spaced apart from the resilient member and the holder device.

19. The aircraft according to claim 15 wherein the emergency undercarriage is deployed to the second position in response to a condition indicative of a blocked basic undercarriage.

* * * * *